(12) United States Patent
Malmborg

(10) Patent No.: US 9,145,771 B2
(45) Date of Patent: Sep. 29, 2015

(54) ROTOR ASSEMBLY DISK SPACER FOR A GAS TURBINE ENGINE

(75) Inventor: Eric W. Malmborg, Amston, CT (US)

(73) Assignee: United Technologies Corporation, Hartford, CT (US)

( * ) Notice: Subject to any disclaimer, the term of this patent is extended or adjusted under 35 U.S.C. 154(b) by 1050 days.

(21) Appl. No.: 12/844,905

(22) Filed: Jul. 28, 2010

(65) Prior Publication Data

US 2012/0027606 A1 Feb. 2, 2012

(51) Int. Cl.
*F01D 5/14* (2006.01)
*F01D 5/08* (2006.01)

(52) U.S. Cl.
CPC ............... *F01D 5/081* (2013.01); *F01D 5/087* (2013.01); *Y10T 29/4932* (2015.01)

(58) Field of Classification Search
CPC .................................. F01D 5/081; F01D 5/087
USPC ............ 415/115; 416/96 A, 96 R, 97 A, 97 R
See application file for complete search history.

(56) References Cited

U.S. PATENT DOCUMENTS

| | | | |
|---|---|---|---|
| 2,470,780 A | 5/1949 | Ledwith | |
| 2,873,947 A | 2/1959 | Perry | |
| 3,094,309 A | 6/1963 | Hull, Jr. et al. | |
| 3,295,825 A | 1/1967 | Hall, Jr. | |
| 3,318,573 A | 5/1967 | Matsuki et al. | |
| 3,551,068 A * | 12/1970 | Allen et al. | 415/173.7 |
| 3,635,586 A | 1/1972 | Kent et al. | |
| 3,709,631 A | 1/1973 | Karstensen et al. | |
| 3,768,924 A | 10/1973 | Corsmeier et al. | |
| 3,834,831 A | 9/1974 | Mitchell | |
| 3,916,495 A | 11/1975 | Klassen et al. | |
| 4,088,422 A | 5/1978 | Martin | |
| 4,111,603 A | 9/1978 | Stahl | |
| 4,231,704 A * | 11/1980 | Ayache et al. | 416/95 |
| 4,269,903 A * | 5/1981 | Clingman et al. | 428/591 |
| 4,457,668 A | 7/1984 | Hallinger | |
| 4,484,858 A * | 11/1984 | Kurosawa et al. | 416/95 |
| 4,576,547 A | 3/1986 | Weiner et al. | |
| 4,645,416 A | 2/1987 | Weiner | |
| 4,659,285 A | 4/1987 | Kalogeros et al. | |
| 4,719,747 A | 1/1988 | Willkop et al. | |
| 4,820,116 A | 4/1989 | Hovan et al. | |
| 4,884,950 A | 12/1989 | Brodell et al. | |
| 4,890,981 A | 1/1990 | Corsmeier et al. | |
| 5,173,024 A | 12/1992 | Mouchel et al. | |
| 5,232,339 A * | 8/1993 | Plemmons et al. | 415/178 |
| 5,236,302 A | 8/1993 | Weisgerber et al. | |
| 5,267,397 A | 12/1993 | Wilcox | |
| 5,267,832 A | 12/1993 | Johnson et al. | |
| 5,281,097 A | 1/1994 | Wilson et al. | |
| 5,288,210 A | 2/1994 | Albrecht et al. | |
| 5,310,319 A | 5/1994 | Grant et al. | |
| 5,340,274 A * | 8/1994 | Cunha | 415/115 |
| 5,388,962 A | 2/1995 | Wygle et al. | |
| 5,472,313 A | 12/1995 | Quinones et al. | |

(Continued)

FOREIGN PATENT DOCUMENTS

JP 10252403 A 9/1998

*Primary Examiner* — Nathaniel Wiehe
*Assistant Examiner* — Woody A Lee, Jr.
(74) *Attorney, Agent, or Firm* — Carlson, Gaskey & Olds

(57) ABSTRACT

A disk spacer for a gas turbine engine includes a rim, a bore, a web and a load path spacer. The web extends between the rim and the bore. The load path spacer is positioned between the rim and the bore.

6 Claims, 3 Drawing Sheets

(56) References Cited

U.S. PATENT DOCUMENTS

| | | | |
|---|---|---|---|
| 5,593,274 A * | 1/1997 | Carreno et al. | 415/115 |
| 5,628,621 A | 5/1997 | Toborg | |
| 5,630,703 A | 5/1997 | Hendley et al. | |
| 5,632,600 A | 5/1997 | Hull | |
| 6,082,967 A | 7/2000 | Loisy | |
| 6,089,827 A | 7/2000 | Ichiryu et al. | |
| 6,267,553 B1 * | 7/2001 | Burge | 415/115 |
| 6,398,485 B1 | 6/2002 | Frosini et al. | |
| 6,464,453 B2 | 10/2002 | Toborg et al. | |
| 6,672,966 B2 | 1/2004 | Muju et al. | |
| 7,059,831 B2 * | 6/2006 | Suciu et al. | 415/199.5 |
| 7,186,079 B2 | 3/2007 | Suciu et al. | |
| 7,234,918 B2 | 6/2007 | Brillert et al. | |
| 7,309,210 B2 | 12/2007 | Suciu et al. | |
| 7,448,221 B2 | 11/2008 | Suciu et al. | |
| 7,507,069 B2 | 3/2009 | Kizuka et al. | |
| 7,726,937 B2 | 6/2010 | Baumann et al. | |
| 2004/0086378 A1 | 5/2004 | Brisson et al. | |
| 2010/0124495 A1 | 5/2010 | Bifulco | |

* cited by examiner

ROTOR ASSEMBLY DISK SPACER FOR A GAS TURBINE ENGINE

BACKGROUND OF THE INVENTION

This application relates generally to a gas turbine engine, and more particularly to a disk spacer for a rotor assembly of a gas turbine engine that provides anti-vortexing features.

A gas turbine engine channels airflow through its core along a desired flow path. Many sections of the gas turbine engine must be cooled to ensure reliable performance and efficiency. For example, the turbine section of the gas turbine engine may require cooling airflow from a compressor section of the gas turbine engine. Cooling airflow of this type may be provided by extracting bleed airflow from the core flow path of the compressor section.

Anti-vortex tubes are used to provide radial inflow of bleed airflow extracted from the core flow path of a compressor section. The anti-vortex tubes reduce vortices within the bleed airflow that reduce the radial inflow of the conditioned bleed airflow. The anti-vortex tubes act as an impeller to raise the pressure of the bleed airflow and prepare the bleed airflow to cool portions of the downstream sections of the gas turbine engine.

The anti-vortex tubes are typically mounted to one or more rotor disks of a rotor assembly and therefore increase the weight carrying load of such rotor disks. The increased weight of the rotor disks may reduce the fatigue life of such components.

SUMMARY

A disk spacer for a gas turbine engine includes a rim, a bore, a web that extends between the rim and the bore, and a load path spacer. The load path spacer is positioned between the rim and the bore.

In another exemplary embodiment, a gas turbine engine includes a rotor assembly having a first rotor disk, a second rotor disk, and a disk spacer. The disk spacer extends axially between the first rotor disk and the second rotor disk. The disk spacer includes a rim, a bore, a web and a load path spacer. The web extends between the rim and the bore. The load path spacer is positioned between the rim and the bore.

In another exemplary embodiment, a method of providing a rotor assembly having a disk spacer for a gas turbine engine includes positioning the disk spacer axially between a first rotor disk and a second rotor disk, communicating a bleed airflow from a core flow path of the gas turbine engine into a cavity of the gas turbine engine, increasing a pressure of the bleed airflow at a location between the first rotor disk and second rotor disk within the cavity, and communicating the bleed airflow from the cavity to an axially downstream portion of the gas turbine engine.

The various features and advantages of this disclosure will become apparent to those skilled in the art from the following detailed description. The drawings that accompany the detailed description can be briefly described as follows.

DETAILED DESCRIPTION

Figure 1:
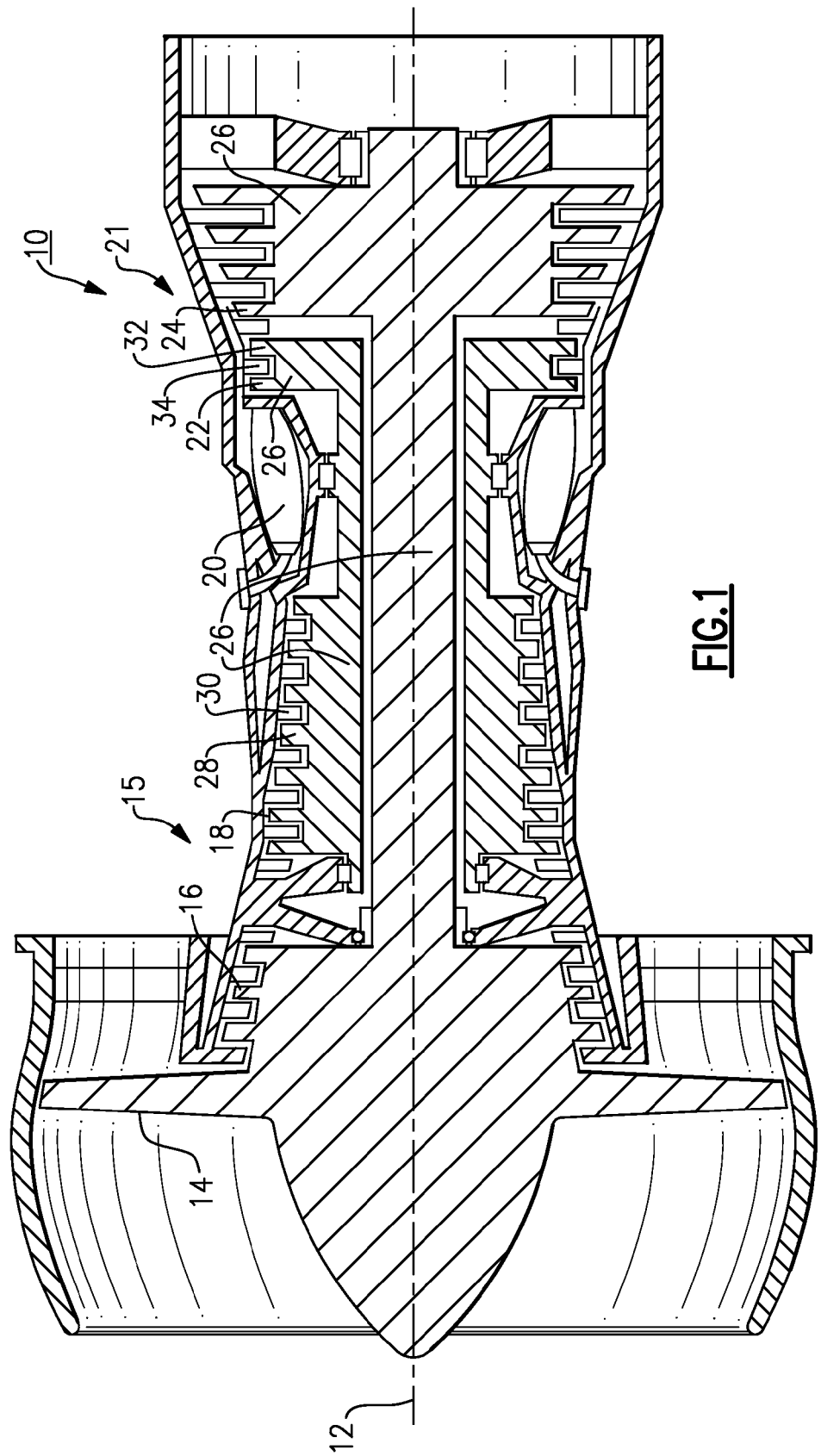
FIG. 1 illustrates a simplified cross-sectional view of a standard gas turbine engine.

FIG. 1 shows a gas turbine engine 10, such as a turbo fan gas turbine engine, that is circumferentially disposed about an engine centerline (or axial centerline axis) 12. The gas turbine engine 10 includes a fan section 14, a compressor section 15 having a low pressure compressor 16 and a high pressure compressor 18, a combustor 20 and a turbine section 21 including a high pressure turbine 22 and a low pressure turbine 24. This application can also extend to engines without a fan, and with more or fewer sections.

As is known, air is compressed in a low pressure compressor 16 and the high pressure compressor 18, is mixed with fuel and burned in the combustor 20, and is expanded in the high pressure turbine 22 and a low pressure turbine 24. Rotor assemblies 26 rotate in response to the expansion, driving the low pressure and high pressure compressors 16, 18 and the fan section 14. The low and high pressure compressors 16, 18 include alternating rows of rotating compressor rotor airfoils or blades 28 and static stator vanes 30. The high and low pressure turbines 22, 24 include alternating rows of rotating turbine rotor airfoils or blades 32 and static stator vanes 34.

It should be understood that this view is included simply to provide a basic understanding of the sections of a gas turbine engine 10 and not to limit the disclosure. This disclosure extends to all types of gas turbine engines 10 and for all types of applications.

Figure 2:
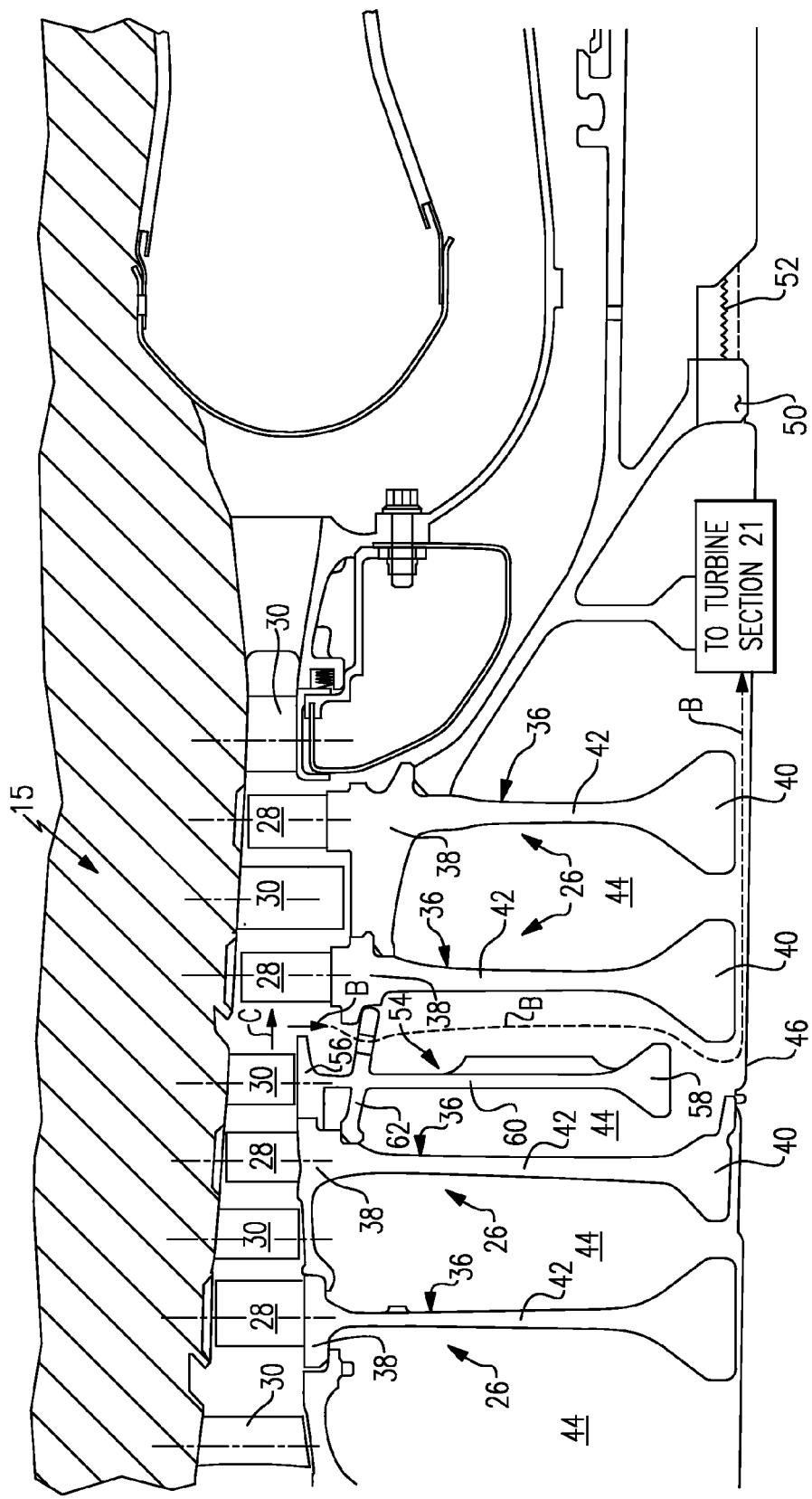
FIG. 2 illustrates a cross-sectional view of a portion of the gas turbine engine.

FIG. 2 shows a portion of the compressor section 15 of a gas turbine engine 10. In this example, the portion depicted is the high pressure compressor 18 of a gas turbine engine 10. However, this disclosure is not limited to the high pressure compressor 18, and could extend to other sections of the gas turbine engine 10.

The illustrated compressor section 15 includes multiple stages of alternating rows of rotor assemblies 26 and stator vanes 30. Although depicted with a specific number of stages, the compressor section 15 could include more or less stages. The stator vanes 30 extend between each rotor assembly 26. Each rotor assembly 26 includes a rotor airfoil 28 and a rotor disk 36. The rotor disks 36 include a rim 38, a bore 40, and a web 42 that extends between the rim 38 and the bore 40. A cavity 44 extends between adjacent rotor disks 36.

A tie shaft 46 is connected to the rotor assemblies 26. The tie shaft 46 can be preloaded to maintain tension on the plurality of rotor assemblies 26. The tie shaft 46 extends between a forward hub (not shown) and an aft hub 50. The tie shaft 46 may be threaded through the forward hub and snapped into the rotor disk 36 of the rotor assembly 26 of the final stage of the compressor section 15. Once connected between the forward hub and the aft hub 50, the preloaded tension on the tie shaft 46 is maintained with a nut 52.

At least one rotor assembly 26 includes a disk spacer 54 axially positioned between adjacent rotor disks 36. That is, the disk spacer 54 is positioned within the cavity 44 that is defined between two adjacent rotor disks 36. The disk spacer 54 is axially offset from the rotor airfoils 28 of adjacent rotor disks 36. In one example, the disk spacer 54 is positioned in a forward stage of the compressor section 15. The actual location of the example disk spacer 54 will vary depending upon a number of factors, including but not limited to, the desired system level efficiency, the cooling flow requirements of the gas turbine engine components, bleed location requirements, and heat transfer requirements.

The example disk spacer includes a rim 56, a bore 58, a web 60 that extends between the rim 56 and the bore 58, and a load path spacer 62 that is positioned between the rim 56 and the bore 58. Among other functions, the disk spacer 54 maintains a desired positioning and supports a load of adjacent rotor disks 36, provides a flow path for receiving a bleed airflow B that is extracted from a core flow path C communicated through the compressor section 15, and provides anti-vortexing features. The bleed airflow B is communicated through the disk spacer 54, into the cavity 44, under the bores 40 of the rotor disks 36, and aft to the downstream sections of the gas turbine engine 10, such as the turbine section 21, for example.

Figure 3:
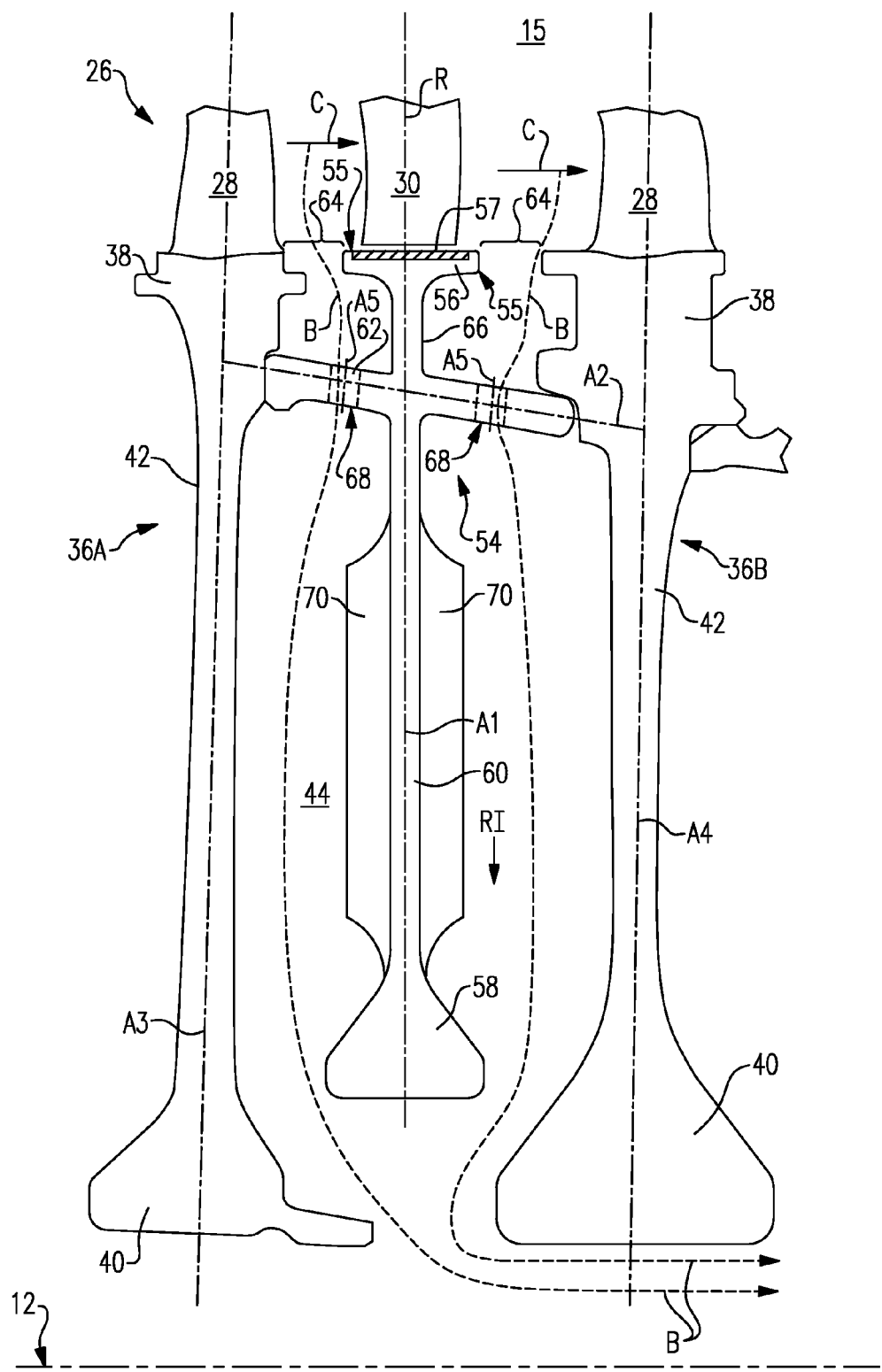
FIG. 3 illustrates an example rotor assembly that includes a disk spacer.

FIG. 3 illustrates an example disk spacer 54 of a rotor assembly 26. The disk spacer 54 is radially trapped between a first rotor disk 36A and a second rotor disk 36B. In this example, the load path spacer 62 of the disk spacer 54 is radially trapped between the rim 38 of the rotor disk 36A and the rim 38 of the rotor disk 36B. Friction forces between the load path spacer 62 and the rims 38 of the first rotor disk 36A and the second rotor disk 36B minimize any circumferential movement of the disk spacer 54 relative to the rotor disks 36. The load path spacer 62 can include a cylindrical shape, a conical shape, a catenary shape or any other shape suitable for bridging the distance between adjacent rotor disks 36. The actual shape of the load path spacer 62 may vary depending upon the size, shape and configuration of adjacent rotor disks 36. Because the disk spacer 54 is radially trapped between the first rotor disk 36A and the second rotor disk 36B, the disk spacer 54 will rotate as the rotor disks 36A, 36B rotate during operation. The disk spacer 54 is positioned in a forward stage of the compressor section 15, in this example. However, other locations may be suitable for the disk spacer 54.

The disk spacer 54 is generally cross-shaped. The rim 56 of the disk spacer 54 is positioned radially inwardly from a stator vane 30 of the compressor section 15. In one example, the rim 56 is coaxial with a radial axis R of the stator vane 30. The rim 56 can also include a seal coating 57, such as Zirconium Oxide, to seal the interface between the stator vane 30 and the rim 56 to reduce the potential for damage to the stator vane 30.

At least one gap 64 extends between an axially outermost tip 55 of the rim 56 of the disk spacer 54 and the rim 38 of at least one of the adjacent rotor disks 36A, 36B. In this example, the gaps 64 extend between the axially outermost tips 55 of the rim 56 of the disk spacer 54 and the rims 38 of each of the adjacent first rotor disk 36A and second rotor disk 36B. The gaps 64 provide a flow path for extracting bleed airflow B from the core flow path C of the compressor section 15. That is, the bleed airflow B is permitted to escape through the gaps 64 toward the load path spacer 62 during operation.

The disk spacer 54 is defined along a longitudinal axis A1. The web 60 of the disk spacer 54 extends substantially along the longitudinal axis A1. In this example, the load path spacer 62 extends along an axis A2 that is generally transverse to the longitudinal axis A1 of the disk spacer 54. The load path spacer 62 may extend generally parallel to the rim 56 of the disk spacer 54, and in another example, may extend slightly transverse relative to the rim 56 of the disk spacer 54. A portion 66 of the web 60 extends between the rim 56 and the load path spacer 62 of the disk spacer 54. In this example, the portion 66 of the web 60 is a smaller than the portion of the web 60 that extends between the load path spacer 62 and the bore 58.

The first rotor disk 36A and the second rotor disk 36B are defined along longitudinal axes A3 and A4, respectively. In this example, the longitudinal axis A1 of the disk spacer 54 is substantially parallel to the longitudinal axes A3, A4 of the first and second rotor disks 36A, 36B.

The load path spacer 62 includes a plurality of openings 68 that communicate the bleed airflow B through the disk spacer 54 and into the cavity 44 defined between adjacent rotor disks 36A and 36B. The openings extend along axes A5 that are generally parallel to the longitudinal axis A1 of the disk spacer 54. In this example, an axially upstream tip of the load path spacer 62 extends axially upstream relative to the axially outermost tip 55 of the rim 56 and an axially downstream tip of the load path spacer 54 extends axially downstream relative to the axially outermost tip 55 of the rim 56.

The web 60 of the disk spacer 54 includes fins 70. The fins 70 function as an impeller on the bleed airflow B. For example, during operation, the disk spacer 54 rotates in unison with the rotor disks 36A, 36B. During rotation, the rotation of the fins 70 conditions the bleed airflow B and communicates the bleed airflow B radially inward (direction RI) toward the centerline axis 12 of the gas turbine engine 10. That is, the fins 70 provide a radial inflow of the bleed airflow B within the cavity 44. The conditioned bleed airflow B then travels below the bores 40 before exiting axially rearwardly for heat exchange with the downstream components of the gas turbine engine 10.

The fins 70 of the web 60 further provide anti-vortexing features, such as increasing the pressure of the bleed airflow B to prepare such airflow to cool the downstream sections of the gas turbine engine 10. For example, once the pressure of the bleed airflow B is increased by the fins 70 of the disk spacer 54, the bleed airflow B is communicated axially downstream to the high pressure turbine section 22 for cooling thereof.

In this example, the fins 70 extend along the web 60 of the disk spacer 54 between the load path spacer 62 and the bore 58. In one example, the fins 70 are integrally formed with the web 60. In another example, the fins 70 are mechanically attached to the web 60.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A disk spacer for a gas turbine engine, comprising:
   a rim;
   a bore;
   a web that extends between said rim and said bore,
   a load path spacer that extends from said web and is spaced from each of said rim and said bore; and
   at least one fin that extends along a portion of said web, wherein said at least one fin is configured to induce radial inflow of a bleed airflow communicated across said at least one fin, and wherein said load path spacer axially extends further from said web than said at least one fin.

2. The disk spacer as recited in claim 1, wherein said load path spacer includes openings operable to communicate a bleed airflow through said disk spacer.

3. The disk spacer as recited in claim 1, wherein said at least one fin extends along said web between said load path spacer and said bore.

4. The disk spacer as recited in claim 1, wherein said web extends along a longitudinal axis, and said load path spacer extends along an axis that is transverse to said longitudinal axis.

5. The disk spacer as recited in claim 1, wherein a portion of said web extends between said rim and said load path spacer.

6. A rotor assembly for a gas turbine engine, comprising:
   a first rotor disk;
   a second rotor disk;

a disk spacer that extends axially between said first rotor disk and said second rotor disk, wherein said disk spacer includes a rim, a bore, a web that extends between said rim and said bore, a load path spacer positioned between said rim and said bore, and at least one fin that extends along a portion of said web; and wherein said at least one fin is configured to induce radial inflow of a bleed airflow communicated across said at least one fin, and said at least one fin axially extends only partially between said first rotor disk and said second rotor disk.

* * * * *